(12) United States Patent
Van Dixhorn et al.

(10) Patent No.: US 11,541,572 B2
(45) Date of Patent: Jan. 3, 2023

(54) SYSTEM AND METHOD FOR CONTROLLING A CONCRETE MIXTURE BASED ON ESTIMATED CONCRETE PROPERTIES

(71) Applicant: NITROcrete IP, LLC, Fort Collins, CO (US)

(72) Inventors: Eric L. Van Dixhorn, Fort Collins, CO (US); Drew R. Nelson, Fort Collins, CO (US); Cameron Wilson, Fort Collins, CO (US)

(73) Assignee: NITROCRETE LLC, Fort Collins, CO (US)

( * ) Notice: Subject to any disclaimer, the term of this patent is extended or adjusted under 35 U.S.C. 154(b) by 0 days.

(21) Appl. No.: 17/463,171

(22) Filed: Aug. 31, 2021

(65) Prior Publication Data
US 2022/0063133 A1    Mar. 3, 2022

Related U.S. Application Data

(60) Provisional application No. 63/072,791, filed on Aug. 31, 2020.

(51) Int. Cl.
*B28C 7/02*       (2006.01)
*B28C 5/46*       (2006.01)
(Continued)

(52) U.S. Cl.
CPC ............. *B28C 7/024* (2013.01); *B28C 5/468* (2013.01); *B28C 7/0084* (2013.01);
(Continued)

(58) Field of Classification Search
CPC ....... B28C 7/024; B28C 5/468; B28C 7/0084; B28C 7/0409; B28C 7/0418;
(Continued)

(56) References Cited

U.S. PATENT DOCUMENTS

| 4,452,535 A | * | 6/1984 | Reid | ...................... B28C 5/46 366/148 |
| 8,989,905 B2 | * | 3/2015 | Sostaric | .............. B28B 23/0031 700/265 |

(Continued)

FOREIGN PATENT DOCUMENTS

| CN | 111411785 | | 7/2020 |
| JP | 3181487 | * | 4/2001 |

(Continued)

OTHER PUBLICATIONS

Machine translation of JP 3181487 Apr. 2001.*
Machine translation of JP 2011-140164 Jul. 2011.*
Machine translation of JP 2009-184273 Aug. 2009.*

*Primary Examiner* — Charles Cooley
(74) *Attorney, Agent, or Firm* — Polsinelli PC

(57) ABSTRACT

Aspects involve estimating transitions in properties of a concrete mixture prior to batching and during transport of the mixture from a first location, such as a concrete batch plant, to a second location, such as a job site and controlling a mixture of ingredients for concrete in response. A tool may execute a method for estimating an initial temperature at batching and a change in temperature of the concrete mixture during transport due to the exothermic reaction of the mixture, percentages and types of ingredients of the mixture, and/or environmental factors along a transit route. A control system at the concrete batching plant may control one or more components of the concrete batch plant in response to the estimated temperature change, such as a dispenser of an ingredient of the mixture and/or a heating or cooling mechanism to adjust the temperature of an ingredient of the concrete mixture.

10 Claims, 8 Drawing Sheets

(51) Int. Cl.
*B28C 7/00* (2006.01)
*B28C 7/04* (2006.01)
*B28C 7/06* (2006.01)
*B28C 7/12* (2006.01)

(52) U.S. Cl.
CPC .......... *B28C 7/0409* (2013.01); *B28C 7/0418* (2013.01); *B28C 7/0486* (2013.01); *B28C 7/06* (2013.01); *B28C 7/12* (2013.01)

(58) Field of Classification Search
CPC .......... B28C 7/0486; B28C 7/06; B28C 7/12; B28C 9/002; B28C 7/0038; C04B 40/0032; G06Q 50/08
See application file for complete search history.

(56) References Cited

U.S. PATENT DOCUMENTS

| | | | | |
|---|---|---|---|---|
| 9,108,883 B2* | 8/2015 | Forgeron | ................ | B29B 7/603 |
| 9,388,072 B1* | 7/2016 | Niven | ................ | B28C 5/462 |
| 9,790,131 B2* | 10/2017 | Lee | ................ | B28C 5/468 |
| 2007/0171764 A1* | 7/2007 | Klein | ................ | B01F 35/91 |
| | | | | 366/4 |
| 2007/0192257 A1* | 8/2007 | Amey | ................ | B28C 5/006 |
| | | | | 705/400 |
| 2007/0266905 A1* | 11/2007 | Amey | ................ | B28C 5/006 |
| | | | | 700/68 |
| 2008/0316856 A1* | 12/2008 | Cooley | ................ | B28C 5/4231 |
| | | | | 366/142 |
| 2011/0029134 A1* | 2/2011 | Hazrati | ................ | B28C 7/026 |
| | | | | 700/265 |
| 2015/0232381 A1* | 8/2015 | Niven | ................ | C04B 28/04 |
| | | | | 106/709 |
| 2017/0361491 A1* | 12/2017 | Datema | ................ | B28C 5/4217 |
| 2018/0252444 A1* | 9/2018 | Nelson | ................ | F25B 19/005 |
| 2020/0018741 A1* | 1/2020 | Roberts | ................ | B28C 7/026 |
| 2021/0035036 A1* | 2/2021 | Tregger | ................ | B28C 5/422 |
| 2021/0291403 A1* | 9/2021 | Goldstein | ................ | B28C 7/026 |
| 2022/0009125 A1* | 1/2022 | Van Dixhorn | ..... | G01B 11/0608 |
| 2022/0055250 A1* | 2/2022 | Nelson | ................ | B28C 7/0038 |
| 2022/0063133 A1* | 3/2022 | Van Dixhorn | ........ | B28C 7/024 |
| 2022/0234249 A1* | 7/2022 | Papania-Davis | ....... | G16C 20/20 |

FOREIGN PATENT DOCUMENTS

| | | | | |
|---|---|---|---|---|
| JP | 2009-184273 | * | 8/2009 | |
| JP | 2011-140164 | * | 7/2011 | |
| WO | WO-2020167731 A1 | * | 8/2020 | .......... B28C 7/0418 |
| WO | 2022/047404 A1 | * | 3/2022 | |

* cited by examiner

SYSTEM AND METHOD FOR CONTROLLING A CONCRETE MIXTURE BASED ON ESTIMATED CONCRETE PROPERTIES

CROSS-REFERENCE TO RELATED APPLICATION

This application is related to and claims priority under 35 U.S.C. § 119(e) from U.S. Patent Application No. 63/072,791 filed Aug. 31, 2020 entitled "System and Method for Estimating Concrete Properties," the entire contents of which is incorporated herein by reference for all purposes.

TECHNICAL FIELD

Aspect of the present disclosure involve concrete manufacturing, and more particularly involves estimating initial properties and changes in properties of concrete after batching, such as temperature, concrete slump, or other fresh properties after batching, both during transit between a concrete batch processing plant and at a site location, and adjusting batch operations responsive thereto in order to deliver concrete within an optimal temperature range and/or other concrete characteristic specifications.

BACKGROUND AND INTRODUCTION

Concrete is made from mixing aggregate, typically sand and gravel or rock, with cement and water, along with property-enhancing chemical admixtures. Mixing cement and water produces heat—it is an exothermic reaction. Proper curing of the concrete can be negatively affected when the temperature of concrete exceeds various thresholds while the concrete is hardening and curing, such as an upper temperature threshold or a lower temperature threshold. These issues may be exacerbated by the exothermic reaction occurring within the concrete mixture. Thus, techniques have been developed to cool the concrete, or some component of the concrete, so that the concrete is and remains cool enough to cure properly. However, concrete is typically mixed at a concrete plant and transported, often in cement mixing trucks, to the job site (or location in which the concrete is to be poured into a mold for curing). During transit, the exothermic reaction within the concrete mixture, along with radiant, convective, and conductive heat transfer, may affect the temperature of the mixture such that the mixture may be within an acceptable temperature range at the concrete plant, but exceed a threshold value upon delivery at the job site and may be rejected for pouring. Furthermore, because the concrete is comprised of various materials, changes in the material temperature can result in a measurable difference in the batched concrete's temperature. For example, aggregate used in a concrete mixture from a stockpile that is located in the sun vs. a stockpile that is located in the shade can affect the temperature of a concrete mixture from batch to batch. In another example, fresh deliveries of cement can exceed temperatures of 180 degrees Fahrenheit such that the age of the cement in a storage bin can affect the concrete temperature during pouring. As deliveries of cement are received throughout the day, fluctuation in concrete temperature is generally expected, but difficult to control. As a concrete plant may provide concrete to several different job sites at different locations over the course of a day (at different distances from the concrete plant) and with numerous variations in the mixture recipe, the amount of pre-cooling of the ingredients of the concrete mixture needed to avoid rejection of the concrete batch at the job site may vary from truckload to truckload, often requiring significant oversight by a concrete plant operator.

It is with these observations in mind, among others, that aspects of the present disclosure were conceived.

SUMMARY

One aspect of the present disclosure relates to a method and tool for controlling a concrete mixture. The method and tool may include the operations of estimating, based on measurements of a plurality of ingredients to a concrete mixture prior to batching, an initial value of a property of the concrete mixture, estimating, based on the initial value of the property of the concrete mixture and a plurality of inputs of environmental conditions, a change in the initial value of the property of a concrete mixture during transport of the concrete batch from a first geographic location to a second geographic location, and controlling, based on the estimated change in the value of the property, a component of a batching plant to alter processing of the concrete mixture to change the value of the property of the concrete mixture after batching.

In some aspects, the plurality of inputs of environmental conditions comprise one of a relative humidity, an ambient temperature, wind speed, an estimated traffic condition of a transit route, or an estimated transport time. The method may also include the operation of obtaining the plurality of inputs from a third-party source. Further, the measurements of the plurality of ingredients comprise one of indicators of the plurality of ingredients to the concrete mixture, percentage of ingredients of the concrete mixture, or properties of the ingredients of the concrete mixture and the method may include obtaining the measurements of the plurality of ingredients via a user interface in communication with a computing device of a batching plant.

In some aspects, the property of the concrete mixture is an internal temperature of the concrete batch. As such, estimating the change in the property of the concrete mixture may include estimating an initial internal temperature of the concrete mixture, estimating a transit time from the first geographic location to the second geographic location, and estimating, based on the estimated initial internal temperature and the estimated transit time, a delivery internal temperature of the concrete mixture. In other instances, the property of the concrete mixture is a slump of the concrete mixture or a viscosity of the concrete mixture.

In still other aspects, the component of the batching plant may be an ice dispenser and controlling the ice dispenser comprises transmitting, based on the estimated change in the value of the property of the concrete mixture, an instruction to the ice dispenser to adjust dispensing of ice into a concrete mixer. Alternatively or in conjunction, the component of the batching plant is a liquid nitrogen dispenser and controlling the liquid nitrogen dispenser comprises transmitting, based on the estimated change in the value of the property of the concrete mixture, an instruction to the liquid nitrogen dispenser to adjust dispensing of liquid nitrogen onto an aggregate of the concrete mixture.

These and other aspects of the present disclosure are discussed in more detail in the detailed description section that follows.

BRIEF DESCRIPTION OF THE FIGURES

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1A:
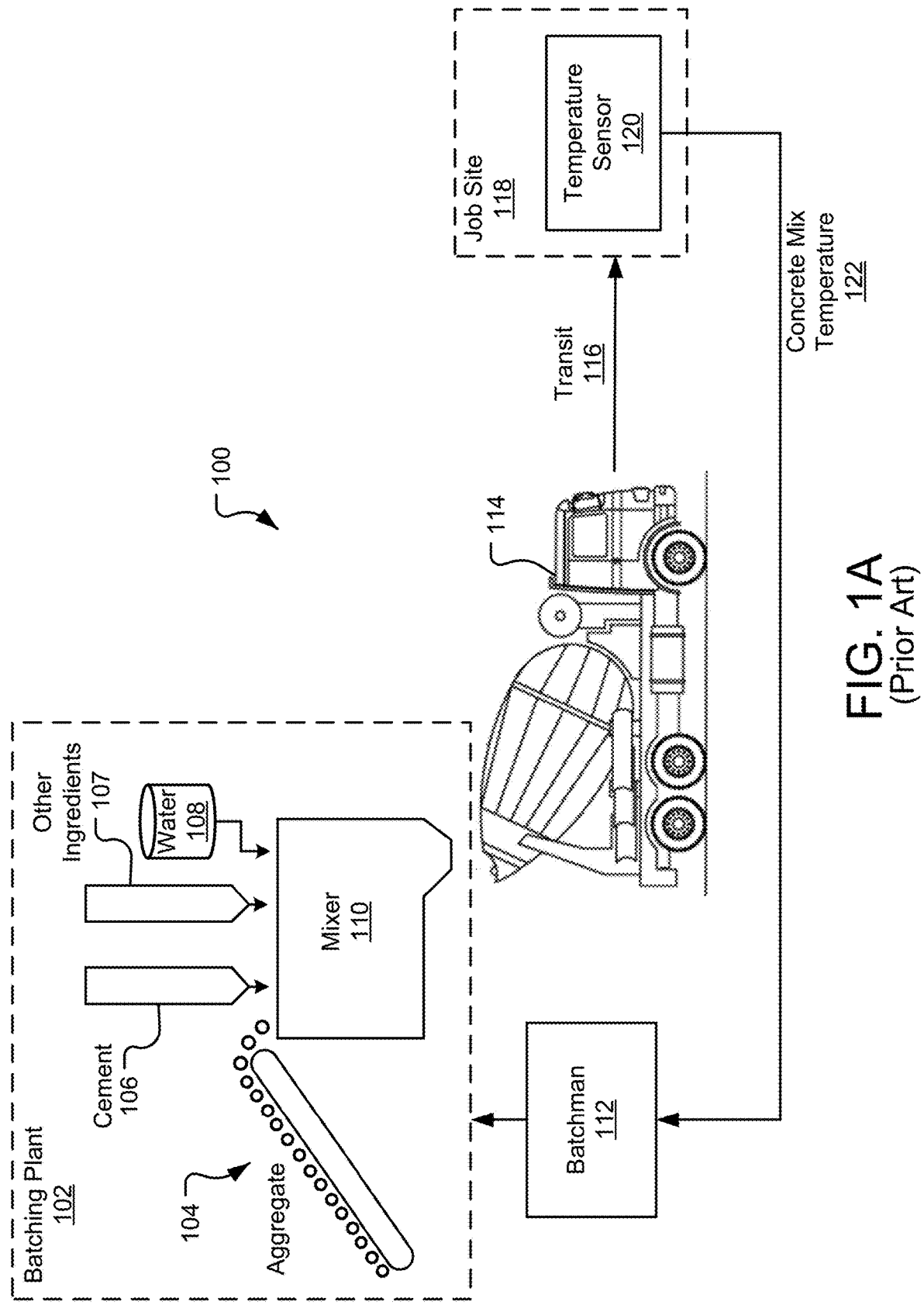
FIG. 1A is a prior art system for conveying a concrete mixture to a job site, according to one embodiment.

Aspects of the present disclosure involve systems and methods, among other things, for controlling concrete processing, including a mixture of ingredients, based on estimating transitions in properties of a concrete mixture prior to batching and during transport of the mixture from a first location, such as a concrete batch plant, to a second location, such as a job site. In one particular implementation, a tool may execute a method for estimating an initial temperature at batching and a change in temperature of the concrete mixture during transport due to the exothermic reaction of the mixture, percentages and types of ingredients of the mixture, and/or environmental factors, such as humidity, ambient temperature, cloud cover, time of day, traffic conditions, estimated route of transporting vehicle, color of a mixing drum of the concrete truck transporting the concrete to the site from the batch plant, and the like. A control system at the concrete batching plant may, utilizing information from the tool, control one or more components of the concrete batch plant in response to the estimated temperature change, such as a dispenser of an ingredient of the mixture and/or a heating or cooling mechanism to adjust the temperature of an ingredient of the concrete mixture. For example, an output of the tool may be an estimated mixture temperature upon arrival at a job site which may be compared to a range of acceptable mixture temperatures for proper curing of the concrete. If the estimated temperature upon arrival exceeds an upper threshold temperature value (e.g., indicating the concrete mixture is too hot to cure properly), the control system may control the one or more components of the concrete batching plant, such as a liquid nitrogen cooling system, in response to the estimated temperature of the mixture as compared to the threshold value to add additional cooling to one or more ingredients and ensure the concrete arrives at the job site at the required temperature. One or more of the components of the concrete batch plant may also be controlled in response to other outputs of the method, such as an estimated slump or viscosity of the concrete mix. In this manner, a concrete mixture may be prepared at the batching plant based on the estimated temperature or other property of the mixture upon arrival at the job site to improve various attributes including reducing a rejection rate of prepared concrete mixtures, improving curing in hot and cold conditions, etc.

In some implementations, the tool may receive various data feeds or otherwise access data including those from a third-party source. In particular, the tool or another computing device may access a server, receiving computing device, website, etc. to obtain one or more of the inputs to the tool and from which it estimates. In one example, the tool may access a server hosting weather data associated with a transit route and obtain estimated humidity, percent of cloud cover, ambient temperature, and the like for the transit route. In another example, the tool may access a server or other data or mapping source to obtain a likely transit path from a concrete batching plant to the job site, traffic information along the route, travel time, alternate routes, etc. In some implementations, one or more of the inputs may be provided via a user interface to the tool. Such inputs may include type and characteristics of a transport vehicle, such as a color of a mixing barrel of the transport vehicle. In still other implementations, the tool executing the method may be in communication with a batch plant controller to obtain one or more inputs including ingredients of a concrete mix, measured or estimated temperature of the ingredients, and/or percentages or volumes of the ingredients in the mix. These and other inputs may be provided to the tool to estimate a temperature (or other characteristic or property) of the concrete mixture upon arrival at the job site.

FIG. 1A is a prior art system 100 for conveying a concrete mixture to a job site 118, according to one embodiment. In general, ingredients for concrete may be mixed at a concrete plant or batch plant 102 and supplied to a mixing truck 114 for transport 116 to the job site 118. The concrete mixture may include several ingredients, including but not limited to, aggregate 104 (which may include rocks, gravel, and/or sand), water 108, cement 106, and a collection of other ingredients 107 (such as fly ash, accelerating or retarding admixtures, air entraining admixtures, etc.). In one implementation, the aggregate 104 may be conveyed on a conveyor device for inclusion into the mixture. The percentages of each of the ingredients 104-108 included in the concrete mixture may be controlled by a batchman 112 to attain a certain recipe with particular properties of the cement mixture, such as cure rate, viscosity, strength, etc. The ingredients 104-108 may be added to a mixer 110 for mixing and pouring into a mixing truck 114 or other transport vehicle. The transport vehicle 114 may convey the concrete mixture to a job site 118 via a transit route 116 for pouring into a concrete mold or other uses. In some instances, the transport vehicle 114 may include a mixing drum that rotates the concrete mix during transport to retain the mix in a plastic state until poured at the job site 118. In some instances, the job site 118 may be several miles from the batching plant 102 over surface streets such that transit 116 of the concrete mixture may remain in the mixing drum for several minutes or hours before reaching the job site 118.

Typically, a temperature of the concrete mixture is obtained at the job site 118 upon delivery to ensure proper curing of the concrete once poured at the site. For example, on-site quality control personnel may determine the concrete mix temperature on the job site 118 via a calibrated concrete thermometer 120. A concrete mix that is too hot or too cold may not meet the project's concrete temperature specifications and may be rejected for use in the project. In some instances, the concrete mix temperature 122 obtained at the job site 118 may be reported back to the batchman 112 for adjustment to the recipe or temperature of one or more of the ingredients. For example, if a concrete mix is rejected at the job site 118, the temperature of the rejected concrete mix may be reported to the batchman 112 such that adjustments to the operations of the batching plant 102 may occur. However, due to the time needed for transit 116, several additional truckloads of concrete mix may already be in transit and are likely to also be rejected, increasing the waste in the concrete transit system 100. The temperature of the concrete mix may also be obtained at other locations in the system 100, such as upon pouring onto the transport truck 114 and, in some instances, during transit 116. However, such temperature measurements of the concrete mix may still occur too late to avoid additional wasted truckloads of concrete mix. Further, such measurements merely provide insight into a current temperature of the concrete mix, without consideration of an increase in the concrete mix due to exothermic reactions and/or environmental heat transfer factors that may occur between mixing and pouring.

Figure 2:
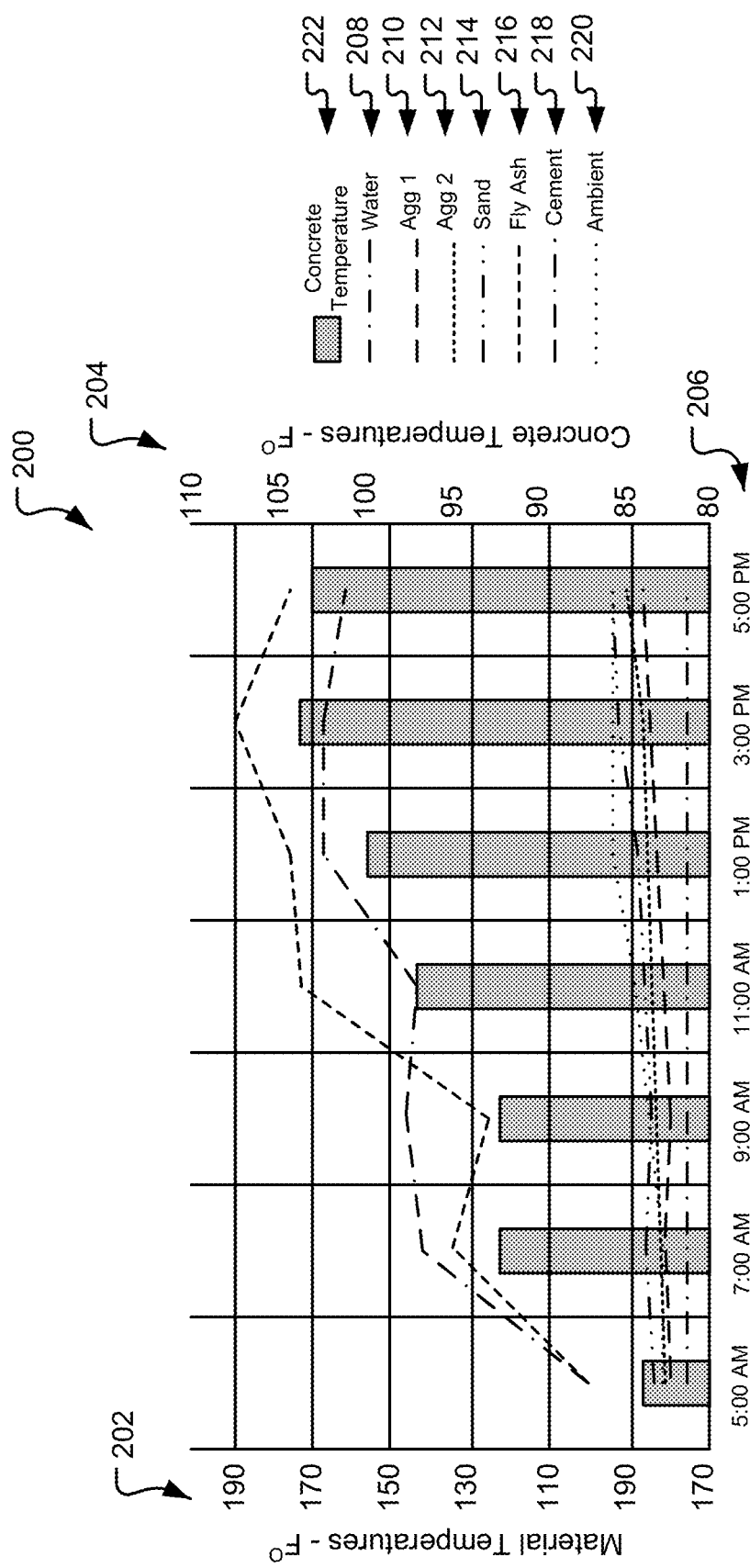
FIG. 2 is a graph illustrating example temperature measurements of the ingredients of a concrete mixture and an overall temperature of the concrete mixture taken over the course of several hours, according to one embodiment.

FIG. 2 is a graph illustrating example temperature measurements of the ingredients of a concrete mixture and an overall temperature of the concrete mixture taken over the course of several hours, according to one embodiment. The graph 200 includes a first y-axis 202 (on the left-hand side of the graph) of temperatures of ingredients to a concrete mixture and a second y-axis 204 (on the right-hand side of the graph) for temperatures of the concrete mixture. The temperature measurements of both the ingredients 202 and the concrete mixture 204 is illustrated across several hours, illustrated along the x-axis 206. In particular, a temperature measurement for each of the ingredients of water 208, a first aggregate 210, a second aggregate 212, sand 214, fly ash 216, and cement 218 is illustrated as measured every two hours from 5:00 AM to 5:00 PM. An ambient temperature measurement 220 is also illustrated over the same period of time in relation to the second x-axis 206 (the concrete temperature scale along the right-hand side of the graph 200). At each interval, an overall temperature measurement of the concrete mixture 222 is illustrated as a grey box. As shown, the temperature of the ingredients 202 may vary significantly throughout a day, particularly the temperature of the fly ash and the cement. This variation may be in response to an increased ambient temperature at the batching plant or any other environmental factor. Because of this increase in the temperature 202 of the ingredients, the temperature 204 of the concrete illustrated by the gray bars increases throughout the day, ranging from below 85 degrees to around 105 degrees Fahrenheit, in this particular example. As should be appreciated, a concrete batch mixed at 3:00 PM would arrive at a job site at a much higher temperature than a concrete batch mixed at 5:00 AM as the initial temperature of the concrete mixture is higher in the afternoon due to an increase in the temperature of the mixed ingredients.

Figure 1B:
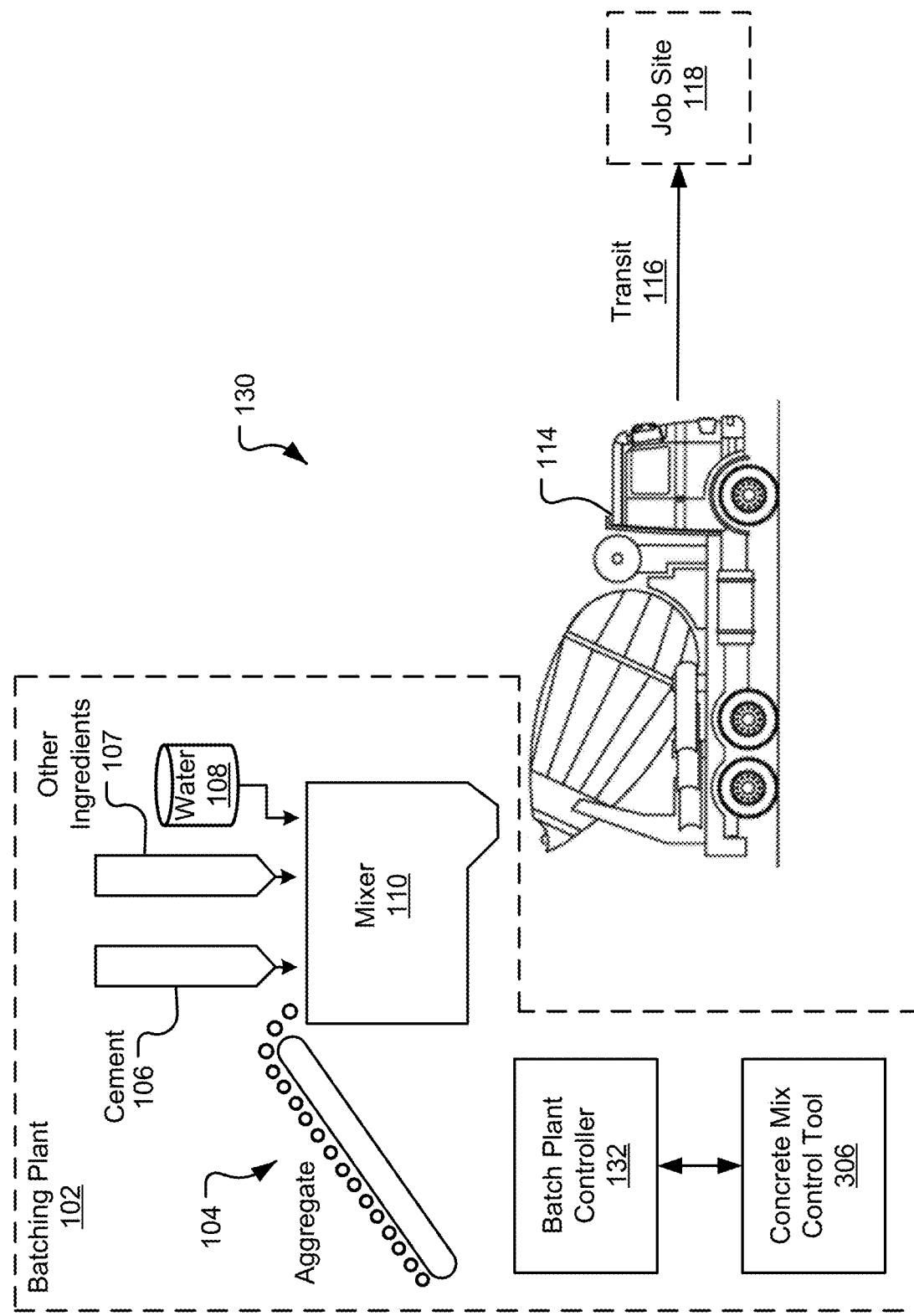
FIG. 1B is a system for utilizing a concrete mix control tool for adjusting a concrete mixture at a batch plant based on an estimated characteristic of the mixture, according to one embodiment.

To provide a more responsive estimate of properties of the concrete mix upon arrival at the job site 118 and to reduce potential waste from the concrete providing system 100, a system or tool for estimating a temperature and other properties of a concrete mixture upon mixing or batching and when delivered to a job site and adjusting a component of a concrete plant based on the estimation may be in communication with a batch plant controller. In particular, FIG. 1B illustrates a system 130 for utilizing a concrete mix control tool for adjusting a concrete mixture at a batch plant based on an estimated characteristic of the mixture, according to one embodiment. Several of the components of the system 130 of FIG. 1B are the same as described above with reference to FIG. 1A, such as a batching plant 102 at which concrete ingredients 104-108 may be added to a mixer 110 and a transit vehicle 114 for transporting the cement mixture to a job site 118. However, instead of including a temperature sensor at the job site 118 and reporting a temperature of the cement mixture upon arrival at the job site, the system 130 of FIG. 1B may include a concrete mix control tool 306 in communication with a batch plant controller 132. In general, the concrete mix control tool may estimate a property of a concrete mixture prior to and/or just after batching and an estimate change in the property in transit from a first location to a second location, such as from the batching plant 102 location to a job site 118 location. The concrete property may include temperature, slump, viscosity, or any other property or characteristic of the concrete mixture. The concrete mix control tool 306 may communicate with one or more components of a batching plant 102, such as a batch plant controller 132, to adjust an aspect of the mixing of the concrete ingredients in response to the estimated initial property or change in properties of a concrete mix. Example operations and configurations of the concrete mix control tool 306 are described in more detail below with reference to FIGS. 3-7.

Figure 3:
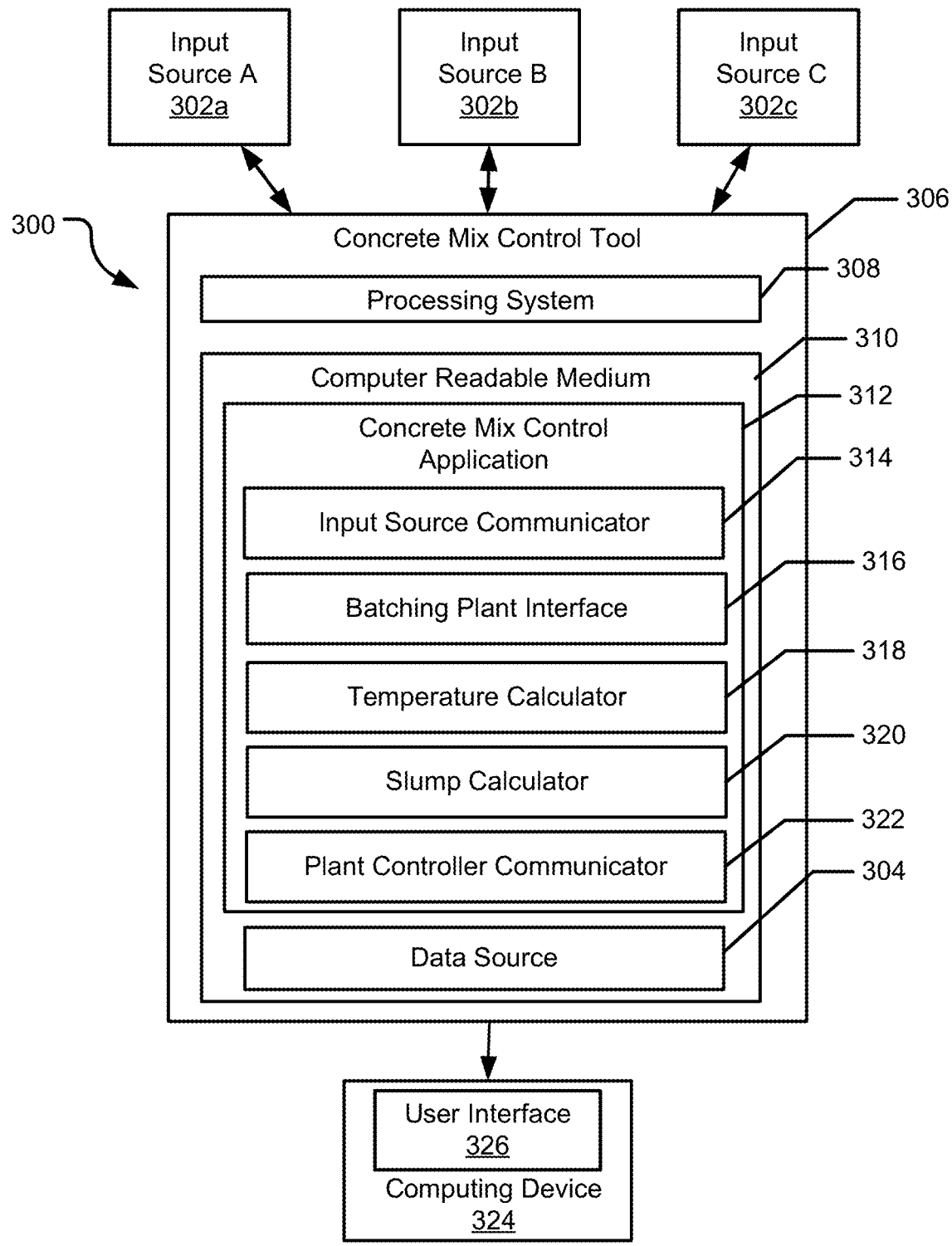
FIG. 3 is a schematic diagram illustrating a system for estimating an initial temperature and other properties of a concrete mixture and/or when delivered to a job site and adjusting a component of a concrete plant based on the estimation, according to one embodiment.

FIG. 3 is a schematic diagram illustrating a system 300 for estimating an initial temperature and other properties of a concrete mixture and/or when delivered to a job site and adjusting a component of a concrete plant based on the estimation, according to one embodiment. As mentioned, the system 300 may include a concrete mix control tool 306 that estimates a property of a concrete mixture prior to and/or just after batching and/or an estimate change in the property in transit from a first location to a second location. The concrete property may include temperature, slump, viscosity, or any other property or characteristic of the concrete mixture. In some instances, the concrete mix control tool 306 may communicate with one or more components of a batching plant 102, such as the batch plant controller 132 of FIG. 1B, to adjust an aspect of the mixing of the concrete ingredients in response to the estimated initial property or change in properties of a concrete mix. For example, the concrete mix control tool 306 may instruct the batch plant controller 132 to control one or more ingredient dispensers to adjust a percentage of a corresponding ingredient to the concrete mix based on an initial temperature estimate or estimate in a temperature change during transit of the concrete mix. In some instances, the concrete mix control tool 306 may communicate directly with one or more components of the batching plant 102 to adjust the ingredients included in the mix. In another example, the concrete mix control tool 306 may control a cooling apparatus of the batching plant 102, or instruct the batch plant controller 132, to adjust a temperature of an ingredient to the concrete mix, such as through an application of a cooling substance onto an ingredient to the mix. The system may also control or provide indications of such to adjust the mixture and the temperature. Aspects and operations of the concrete mix control tool 306 are described in more detail below.

In some instances, the concrete mix control tool 306 may include a concrete mix control application 312 executed to perform one or more of the operations described herein. The concrete mix control application 312 may be stored in a computer readable media 310 (e.g., memory) and executed on a processing system 308 of the concrete mix control tool 306 or other type of computing system, such as that described below. For example, the concrete mix control application 312 may include instructions that may be executed in an operating system environment, such as a Microsoft Windows™ operating system, a Linux operating system, or a UNIX operating system environment. The computer readable medium 310 includes volatile media, nonvolatile media, removable media, non-removable media, and/or another available medium. By way of example and not limitation, non-transitory computer readable medium 310 comprises computer storage media, such as non-transient storage memory, volatile media, nonvolatile media, removable media, and/or non-removable media implemented in a method or technology for storage of information, such as computer readable instructions, data structures, program modules, or other data. In other instances, the concrete mix control application 312 may be a standalone application that is stored locally (such as in the concrete mix control tool 306, the batch plant controller 132, or other computing device of the batching plant 102) or stored remotely (hosted on a server or other remote computing device) that is accessible by way of a network connection.

The concrete mix control application 312 may also be in communication with a data source 304 of the computer readable media 310 for storage of data and information associated with the concrete mix control tool 306. For example, the concrete mix control application 312 may access route and/or environmental information associated with a transit route from a first location, such as a batching plant 102, to a second location, such as a job site 118. In another example, the data source 304 may include data associated with a concrete mix, such as types, temperatures, and percentages of ingredients in the concrete mix. In still another example, the concrete mix control application 312 may access information for accessing other computing devices, such as a batching plant controller 132, other components of the batching plant, a computing device 324 executing a user interface 326, third-party sources of data (such as input sources 302a-c), and the like. In general, any data utilized by the concrete mix control application 312 for operation may be stored in the data source 304. The data source 304 may be local to the batching plant 102 or concrete mix control tool 306 or remote, such as located in a cloud environment or other remote location accessible via a network connection.

The concrete mix control application 312 may include several components to perform one or more of the operations described herein. For example, the concrete mix control application 312 may include an input source communicator 314 for communicating with one or more sources of input data. For example, the input source communicator 314 may translate instructions for or otherwise communicate with input source A-C 302a-c to obtain third-party data or other data, information, or inputs from the sources 302a-c. Such input data may include, but is not limited to, environmental information for a geographic area corresponding to a potential transit route from the batching plant 102 to the job site 118 (such as a relative humidity, an ambient temperature, wind speed, a cloud cover percentage, a weather forecast, etc.), a calculated transit route (including estimated distance and travel time), traffic conditions along the transit route, and the like. In one particular instance, the input sources 302a-c may include a website and the input source communicator 314 may access the website to access particular information corresponding to the transit route (such as starting location and ending location) to obtain the input source data. More particularly, the website may be hosted on one or more servers accessible through a network, such as the Internet. Through interactions with the website, the input source communication 314 may obtain the transit data from the one or more servers. As mentioned above, such obtained data may be stored in the data source 304 for use by one or more of the components of the concrete mix control application 312 to estimate a characteristic or property of a concrete mix at a batching plant 102 or in transit 116 to a job site 118.

Other inputs may also be provided to or obtained by the concrete mix control application 312 for use in estimating an initial concrete temperature after batching and/or a change in a concrete mixture property during transit 116 from a first location 102 to a second location 118. In one particular implementation, the concrete mix control application 312 may include a batching plant interface 316 for communicating with one or more components or devices of a batching plant 102 at which concrete is mixed. For example, the plant interface 316 may communicate with a control system 132 of the batching plant 102 to obtain an identification of the ingredients of a concrete mix, such as a type of aggregate 104, a type of cement 106, and/or an identifier of other ingredients 107, such as fly ash and water. Further, the control system 132 of the batching plant 102 may provide an indication of an amount of each ingredient to the concrete mix, such as pounds per cubic yard of concrete for dry ingredients and/or gallons of water in the concrete mixture, along with each material's corresponding temperature. The temperature of the ingredients included in the mixture may be obtained from one or more temperature sensors integrated with a storage device for the ingredients. In one instance, the amount of each ingredient may be provided as a percentage of the overall mixture, such as one part cement, two parts sand, three parts aggregate, etc. Further still, the plant interface 316 may receive or obtain an indication of a cooling or heating agent added to the concrete mixture and an amount of such cooling agent, such as pounds per cubic yard of concrete for added ice and/or gallons of liquid nitrogen applied to the aggregate or other ingredient to lower the temperature of the cooled ingredient during or prior to mixing. Properties of each ingredient may also be obtained or received, such as a percentage of moisture for one or more of the ingredients, a temperature (measured or estimated) of one or more ingredients, the specific heat of each individual ingredient, an estimated heat transfer for each ingredient, and the like. The concrete mix control tool 306 may also directly communicate with one or more other components of the batching plant 102 to execute any of the above operations. In still other instances, the plant interface 316 may include a user interface (such as user interface 326 executed on computing device 324) for receiving one or more of the batching plant inputs. In such instances, an operator of the tool 306 (such as a batchman) or other system or device of the batching plant 102 may access the user interface 326 to provide one or more of the above mentioned inputs to the concrete mix control application 312. The concrete mix control tool 306 may also provide one or more settings, measurements, readings, instructions, and/or any other data to the user interface 326 for display. For example, the concrete mix control tool 306 may display a target concrete mixture recipe on the user interface 326 from which a batchman or other user of the interface may adjust the concrete mix according to the displayed recipe.

Regardless of the mechanism or system by which the inputs are received, the concrete mix control application 312 may utilize the inputs to determine one or more properties of a concrete mixture. For example, the concrete mix control application 312 may determine an initial temperature of the concrete mixture from the type, amount, and temperature of ingredients to the mixture. The concrete mix control application 312 may also determine a change in a property of a cement mixture between the time of mixing to the time of delivery at a job site 118. In one particular example, the concrete mix control application 312 may include a temperature calculator 318 to estimate a temperature of a concrete mixture upon arrival at a job site 118 based on, among other factors, an estimated initial mixture temperature, a recipe of the mixture, and a transit route between the batching plant 102 and the job site 118. In general, the temperature calculator 318 may receive inputs from one or more input sources 302 and execute a method or other procedure, utilizing the inputs, to estimate the properties of the concrete mixture, such as the arrival temperature of the concrete mix. In some instances, the method may output an estimated temperature, a range of estimated arrival temperatures, a graph of the estimated temperature rise during transit 116, instructions to a concrete mix temperature controller 132 or other component of the concrete mix control tool 306, and the like. Still other inputs and/or outputs of the temperature calculator 318 are contemplated. The various inputs to the temperature calculator 318 and aspects of the method executed by the temperature calculator are discussed in greater detail below.

The concrete mix control application 312 may also estimate initial values of other properties and/or changes to the properties of a concrete mix during transit 116 of the concrete mix from a first location 102 to a second location 118. In one implementation, the concrete mix control application 312 may include a slump calculator 320 for estimating an initial slump and/or a change in slump of the concrete mix during transit 116. In general, the slump value of a concrete mixture indicates the workability or consistency of the concrete mixture. A mixture with higher slump is generally easier to mold or smooth out, while a mixture with a lower slump is difficult to mold or shape. Thus, a truckload of concrete may be tested for slump at the job site 118 and, if determined to have too high or too low a slump, may be rejected for use. In most instances, the slump of a concrete mix may correspond to the amount of water 108 included in the mixture. Therefore, slump may be affected by the temperature of the concrete as the water 108 in the mixture evaporates at a rate correlating to an internal temperature of the concrete mix (e.g., a higher temperature leads to higher evaporation of the water, which may cause a drop in the slump of the mix). The slump calculator 320 of the concrete mix control application 312 may receive similar inputs as the temperature calculator 318 and output an estimated initial slump value for the concrete mix or at the job site 118. Changes in other concrete mix properties, such as viscosity, curing rate, changes in properties of certain concrete ingredients (such as temperature of pre-cooled aggregate, water evaporation, etc.), and the like may also be estimated by the concrete mix control application 312 based on the inputs received by the application. The temperature calculator 318 and the slump calculator 320 are just some examples of components of the concrete mix control application 312 that may estimate an initial value or change in different types of concrete mix properties between mixing of the concrete and delivery at the job site 118.

As discussed above, one or more components of the batching plant 102 may be controlled or configured in response to an output from the temperature calculator 318, slump calculator 320, or any other component of the concrete mixt control tool 306 executing a method to determine an estimated initial value or change in a concrete mix property during transit 116 of the mix to a job site 118. As such, the concrete mix control application 312 may include a plant controller communicator 322 to provide instructions, adjustments, configurations, and the like to a plant controller in response to an output of a component or calculator of the concrete mix control application 312. The instructions may cause the plant controller to adjust the mixture of the concrete and/or a heating/cooling apparatus at the batching plant 102 such that the estimated temperature or other mixture properties at the job site 118 are within an acceptable range of values. For example, the instructions may cause the plant controller to increase a percentage of water in a concrete mixture based on an estimated initial slump value of the concrete mix or slump value upon arrival at the job site 118. In another example, the instructions may cause the plant controller to activate a heating or cooling apparatus of the batching plant 102 to adjust a temperature of an ingredient to the concrete mixture in response to an estimated temperature of the concrete mixture at the job site 118. Such heating or cooling apparatus may include a water heating unit, a water cooling unit, an ice dispensing system for adding ice to the mixture, or a liquid nitrogen dispensing system for cooling aggregate 104 or other ingredients, and the like. Control of components of the batching plant 102 in response to an output from a method or component of the concrete mix control application 312 is discussed in more detail below.

The concrete mix control application 312 may also communicate with a computing device 324 executing a user interface program 326, as mentioned above. The computing device 324 may provide the user interface (e.g., a command line interface (CLI), a graphical user interface (GUI), etc.) 326 displayed on a display, such as a computer monitor, for displaying data. Through the user interface 326, a user may provide control inputs for manipulating the concrete mix control application 312 through one or more input devices. For example, control of a batch plant controller may be provided via the user interface 326 to adjust the concrete mix ingredients as a percentage of the overall mixture, and the like. The input device for providing the inputs to the user interface 326 may include, among others, a keyboard or a pointing device (e.g., a mouse, trackball, pen, or touch screen) to enter data into or interact with the user interface.

It should be appreciated that the components described herein are provided only as examples, and that the application 312 may have different components, additional components, or fewer components than those described herein. For example, one or more components as described in FIG. 3 may be combined into a single component. As another example, certain components described herein may be encoded on, and executed on other computing systems, such as on one remotely coupled to the concrete mix control tool 306.

Figure 4:
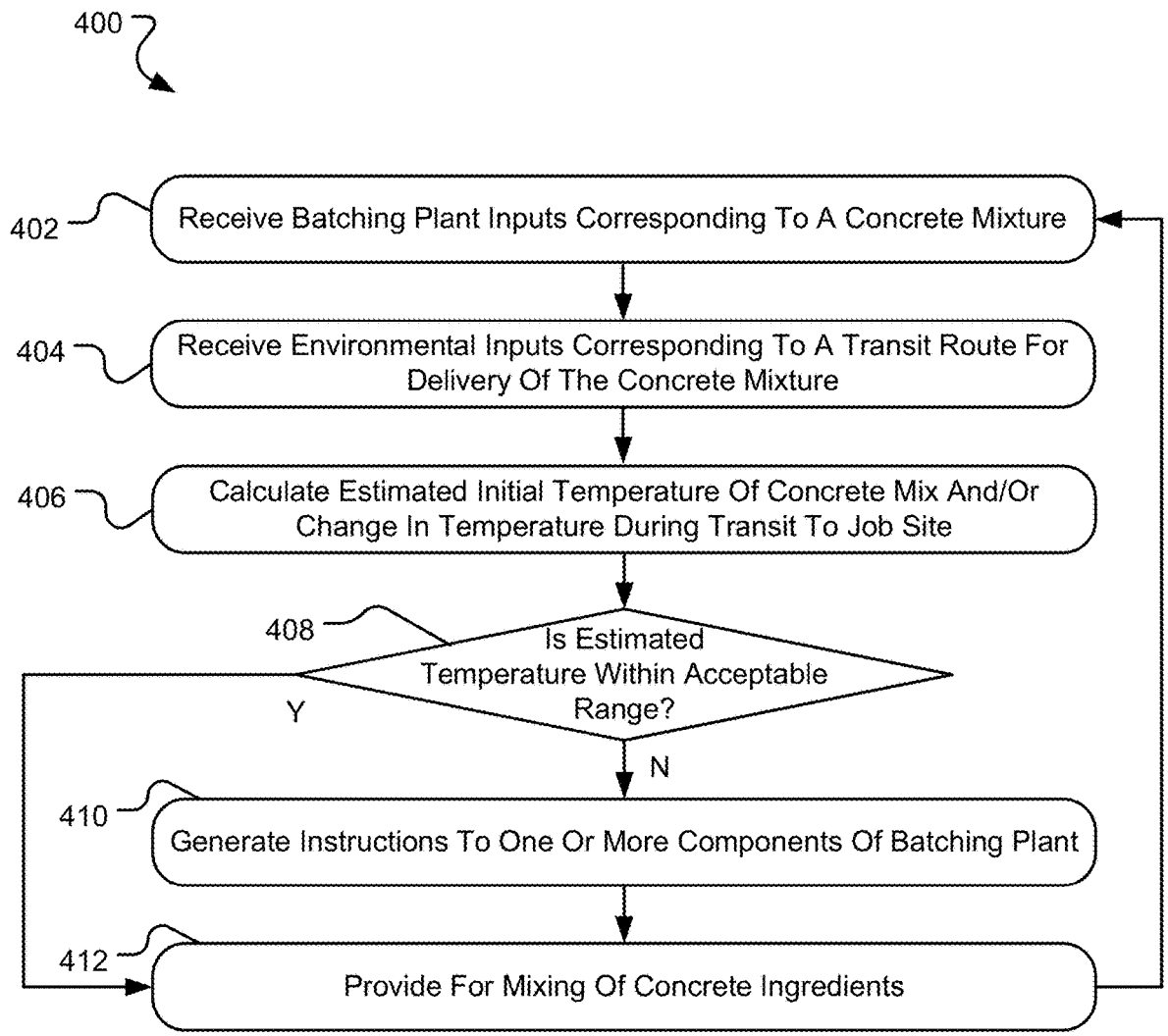
FIG. 4 is a flowchart of a method for estimating an initial temperature and other properties of a concrete mixture and/or when delivered to a job site and adjusting a component of a concrete plant based on the estimation, according to one embodiment.

Turning now to FIG. 4, a method 400 for estimating an initial temperature and other properties of a concrete mixture and/or when delivered to a job site and adjusting a component of a concrete plant based on the estimations, according to one embodiment, is illustrated. In one instance, the operations of the method 400 may be executed or performed by components of the concrete mix control application 312 discussed above. In other instances, one or more of the operations of the method 400 may be performed by still other computing devices, such as a batching plant controller or networking device.

Beginning in operation 402, the concrete mix control tool 206 may receive one or more batching plant inputs corresponding to a potential concrete mixture. As discussed above, the batching plant inputs may include identifications of the ingredients of a concrete mix, indications of an amount of each ingredient to the concrete mix (in gross volume or percentages of the mixture), properties of each ingredient (such as measured temperature), and the like. The inputs may be received at the concrete mix control tool 306 via communications with a batching plant controller 132, via a user interface associated with an operator of the batching plant, communications with one or more components of the batching plant, and the like. In a similar manner, the concrete mix control tool 306 may receive environmental inputs from one or more data sources 302 corresponding to a transit route to be taken by a delivery truck or other transport vehicle to deliver the potential concrete mixture to a job site 118 in operation 404. As discussed above, the environmental inputs may include a relative humidity, an ambient temperature, wind speed, a cloud cover percentage, or other weather conditions of a geographic area associated with a potential transit route. Information or data corresponding to the potential transit route itself may also be received, such as turn-by-turn instructions for the transport vehicle 114, an estimated transit time (which may include an elapsed time between loading the transport vehicle with the concrete mixture and beginning of transportation of the mixture to the job site 118), current and predicted traffic conditions along the potential transit route, an estimated distance traveled, and the like. Still further, data and information of the transport vehicle 114 may also be obtained or received, such as an indication of a color of the vehicle and/or operational parameters of the vehicle (such as air pressure of the tires, gas mileage efficiency, etc.). This information may be received via the user interface 326 executed on the computing device 324 or may be obtained directly by the concrete mix control tool 306 via one or more input sources 302.

In operation 406, the concrete mix control tool 306 may calculate, using the various inputs received, an estimated initial temperature of the concrete mixture and/or an estimated temperature of the concrete mix upon arrival at the job site 118. In one implementation, the concrete mix control tool 306 may estimate the initial temperature of the concrete mixture via the received batching plant inputs. For example, the concrete mix control tool 306 may apply properties of the identified ingredients to the concrete mix, such as initial temperature of the individual ingredients, specific heat, heat retention and/or dispersion, quantity of the individual ingredients, and the like to a formula to obtain the estimated initial temperature of the concrete mixture. In some instances, information of a cooling or heating unit associated with one or more of the ingredients may also be obtained, such as an amount of ice included in the mixture or an amount of liquid nitrogen expelled from a cooling system onto an aggregate ingredient of the mixture. Further, the concrete mix control tool 306 may also determine an estimated rate of temperature change for the potential concrete mixture while mixed at the batching plant 102 and/or while loaded onto the transport vehicle 114. The rate of temperature change may correspond to different sections of the transportation of the concrete mix to the job site 118. For example, a first rate of temperature change may be obtained for the concrete mixture while at the batching plant and may be based on inputs from a batching plant controller 112, such as the percentage of ingredients in the mixture and an elapsed time the mixture is located within the mixer 110 of the plant 102 before loading onto the transport vehicle 114. A second rate of temperature change may be obtained based on a section of the transportation in which the concrete mixture is loaded onto the transport vehicle 114. Still another rate of temperature change may be obtained based on a transit of the concrete mixture to the job site 118. This rate of temperature change may utilize the environmental inputs, transit route inputs, transport vehicle inputs, and other information when determining or estimating the rate of temperature change of the concrete mix. Other segments of the transit 116 may also be associated with still other rates of temperature change and determined by the concrete mix control tool 306. Further, although discussed in relation to temperature, it should be appreciated that other concrete mix properties may also be estimated, both as an initial value and an estimated change during transit.

With the various rates of temperature change of the concrete mix calculated or otherwise determined, the concrete mix control tool 306 may also determine an estimated temperature of the concrete mix upon arrival at the job site 118. For example, the concrete mix control tool 306 may consider the estimated initial temperature of the concrete mixture, a first rate of temperature change associated with the batching plant 102, an estimated time the concrete mixture is to be located at the batching plant before loading onto the transport vehicle, a second rate of temperature change associated with the concrete mixture on the transport vehicle (which may be based on environmental data associated with an expected transit route), and an estimated time between loading of the concrete mixture and arrival at the job site 118 (which may be based on data associated with the expected transit route, including predicted traffic conditions) to estimate the temperature of the concrete mixture upon arrival or dispersal at the job site 118. As should be appreciated, other properties, qualities, or characteristics of the potential concrete mixture may also be estimated according to the transportation of the concrete mixture to the job site 118.

In operation 408, the concrete mix control tool 306 may determine if the estimated temperature of the potential concrete mixture at the job site 118 is within an acceptable range of temperatures. For example, the acceptable temperature range for the concrete mixture may include an upper threshold temperature value at which a concrete mixture may cure improperly or may be otherwise structurally weakened. In a similar manner, the acceptable temperature range for the concrete mixture may include a lower threshold temperature value at which a concrete mixture may cure improperly. Thus, the acceptable range of concrete mixture temperatures may define a range of temperatures at which a concrete mixture may be safe or acceptable to pour at the job site 118. If the estimated temperature of the potential concrete mixture is determined to be within the range of acceptable temperatures, the concrete mix control tool 306 may provide for the mixing of the concrete ingredients at the batching plant 102 in operation 412. In one instance, the concrete mix control tool 306 may provide an indication of an acceptable mixture temperature to a batching plant controller at the current recipe of ingredients as provided above by the batching plant inputs. However, if the estimated temperature of the potential concrete mix is outside the acceptable range of temperatures, the concrete mix control tool 306 may generate one or more instructions for components of the batching plant 102 to adjust the mixture based on the estimated delivery temperature in operation 410. The instructions may include commands to a batching plant controller 132 to alter the recipe for the potential concrete mixture, commands to one or more dispersing units for one or more ingredients of the concrete mixture to adjust the mixture recipe, commands to the plant controller or temperature-adjusting units to alter an initial temperature of one or more of the ingredients, and the like. In one particular example, the concrete mix control tool 306 may command the plant controller 132 or a liquid nitrogen cooling system to increase a flow of liquid nitrogen onto an aggregate ingredient 104 to lower the initial temperature of the aggregate and, thereby, lower the expected delivery temperature of the concrete mixture. In another example, the concrete mix control tool 306 may command the plant controller 132 or a water heating system to heat the water 108 and increase the initial temperature of the aggregate and, thereby, increase the expected delivery temperature of the concrete mixture. In still another example, the concrete mix control tool 306 may command the plant controller 132 or an ice dispensing system to increase an amount of ice included in the concrete mixture to lower the initial temperature of the aggregate and, thereby, lower the expected delivery temperature of the concrete mixture. In yet another example, the concrete mix control tool 306 may display, on the user interface 326 executed on the computing device 324, a command, an indicator, an alarm, an instruction, etc. to a user of the interface 326 to adjust the concrete mixture.

Following the generation of the control instructions, the concrete mix control tool 306 may proceed to operation 412 and provide for the mixing of the concrete ingredients, with the adjustments to the mixture properties. Upon the mixing of the concrete ingredients, the concrete mix control tool 306 may return to operation 402 to receive new inputs and re-calculate the estimated mixture temperature, perhaps based on the new or adjusted recipe, a change in transit conditions, activation of a cooling/heating system at the batch plant 102, and the like. Thus, through the method 400, the concrete mix control tool 306 may determine or adjust a concrete mixture based on the estimated delivery temperature or other concrete properties.

Figure 5:
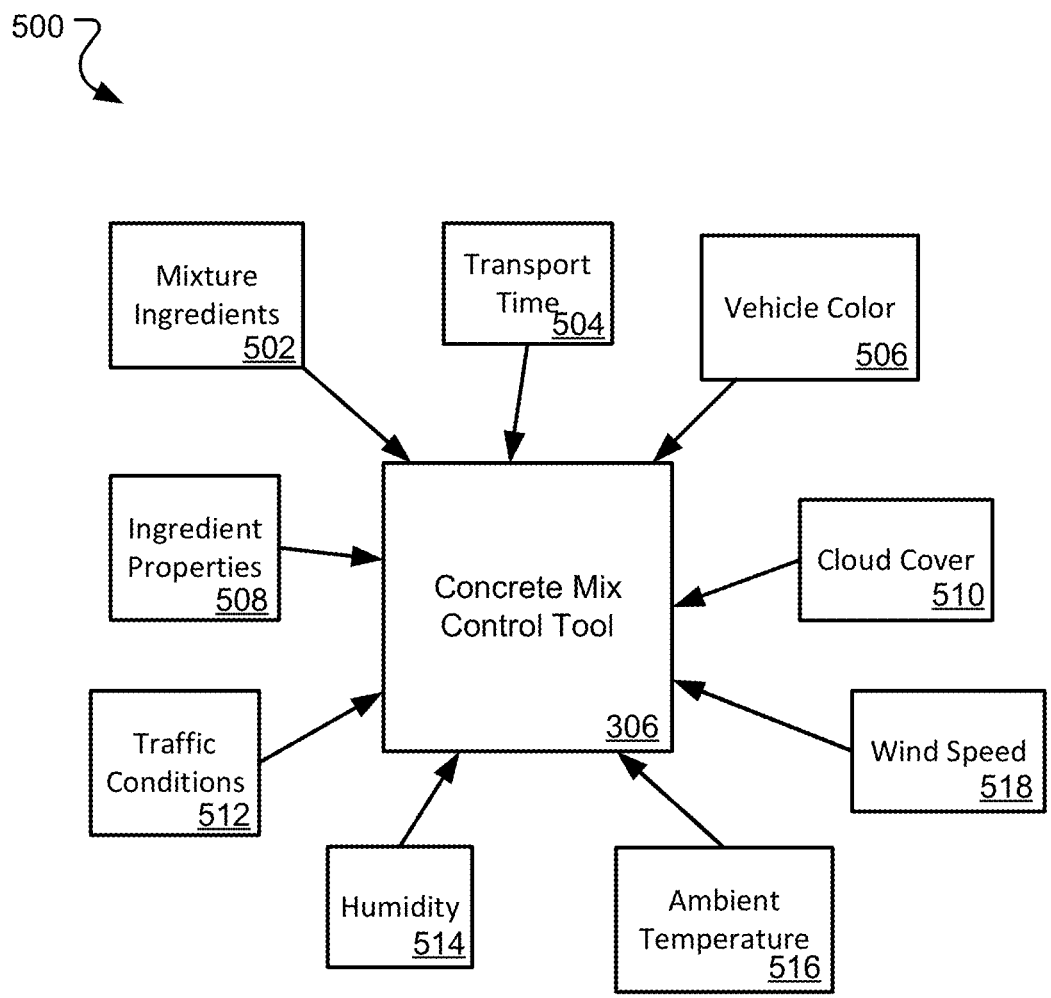
FIG. 5 is a schematic diagram illustrating inputs to the system for estimating an initial temperature and other properties of a concrete mixture and/or when delivered to a job site and adjusting a component of a concrete plant based on the estimation, according to one embodiment.

FIG. 5 is a schematic diagram 500 illustrating just some of the inputs to the concrete mix control tool 306 for estimating a temperature and other properties of a concrete mixture, both upon batching and when delivered to a job site 118, according to one embodiment. The inputs 502-518 illustrated in FIG. 5 are discussed above and may be received from a batch plant computing device, a batch plant controller 132, via a user interface 326 as input by a user of the interface, from one or more third-party source 302a-c computing devices, and the like. As shown, the inputs 502-518 may include an indication of types of ingredients 502 of a concrete mix (such as aggregate, sand, fly ash, water, etc.) and one or more properties 508 of the identified ingredients (such as percentage of total mixture, mass of ingredients, temperature of the ingredients, specific heat, etc.). Other inputs may be associated with a transit 116 of the concrete mix to a job site 118. Such inputs may include an estimated transport time 504 and predicted traffic conditions 512 along a potential route to the job site 118. Still other inputs may include weather information or data, such as a relative humidity 514 along the potential route, an ambient temperature 516 along the route, wind speed 518, and an expected percentage of cloud cover 510. Additional inputs may be associated with the transport vehicle, such as an indication of a color 506 of an outer surface of the transport vehicle 114. These and any other inputs may be provided to the concrete mix control tool 306, although not all such inputs are illustrated in the diagram 500 of FIG. 5.

Figure 6:
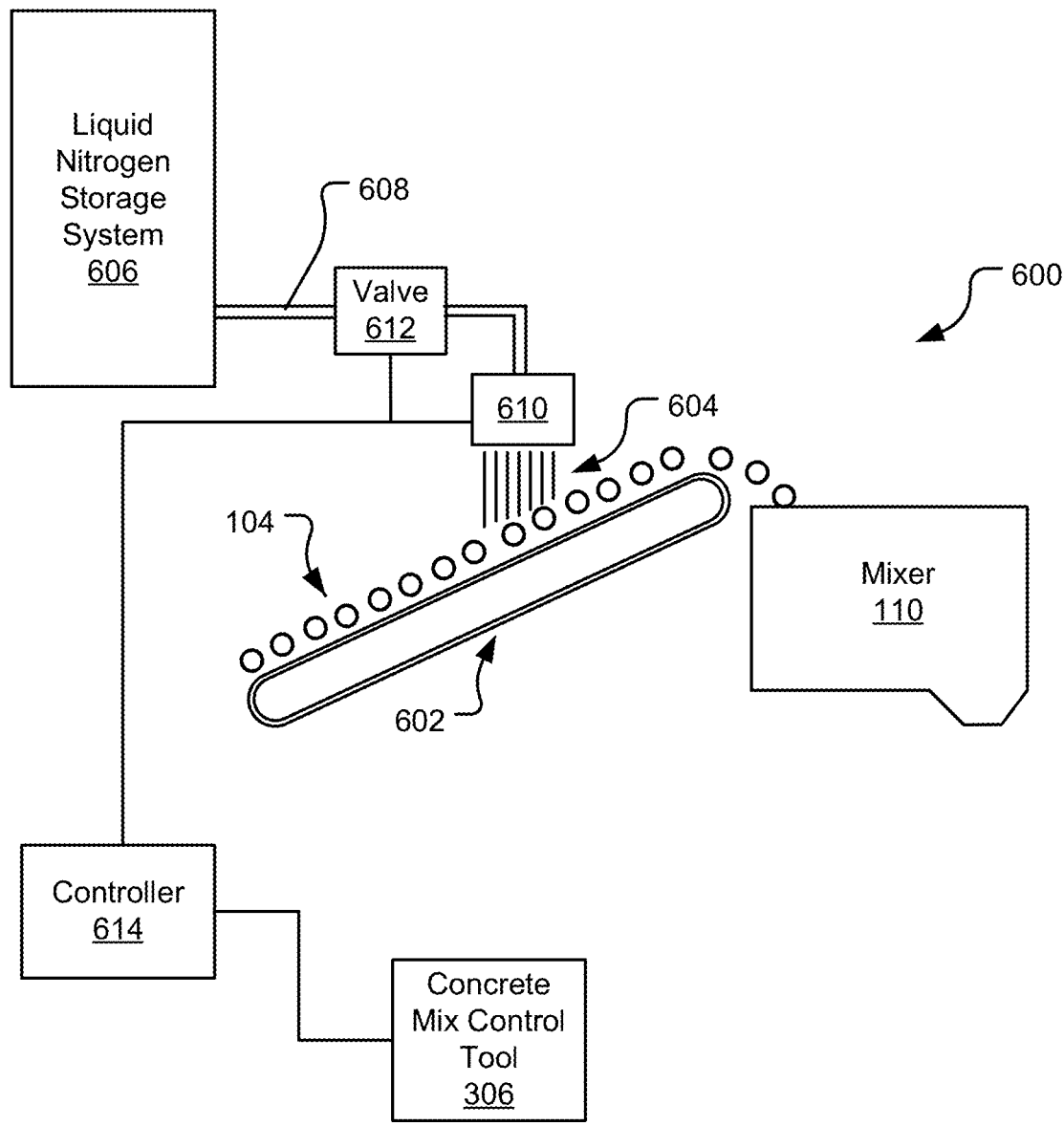
FIG. 6 is a system for cooling aggregate, e.g., aggregate for use in concrete mixture, based on an estimated initial temperature value or change of the concrete mixture in transit, according to one embodiment.

As mentioned above, one potential output of the concrete mix control tool 206 includes commands, instructions, or other communications with a liquid nitrogen cooling system for applying liquid nitrogen to aggregate on a conveyance device. FIG. 6 illustrates an embodiment of such a system 600 that can be used for cooling aggregate 104, e.g., aggregate for use in a concrete mixture. In accordance with this embodiment, aggregate 104 can be cooled by applying nitrogen 604 to the aggregate 104 prior to the aggregate entering a mixing chamber 110. By cooling the aggregate 104 with liquid nitrogen 604 prior to the aggregate being added to the mixing chamber 110, a cooling of the aggregate can be accomplished to lower an initial temperature of a concrete mixture based on an estimated temperature of the mixture at a job site 118. In the cooling system 600 of FIG. 6, an aggregate conveyance device 602 is used to convey the aggregate 104 or a mixture of aggregate, and/or cement. The conveyance device 602 may be a conveyor belt or a chute, for example. In one instance, the conveyor 602 transports the contents of the conveyor belt to mixer 110. Further constituents, such as water and cement can also be added to the mixing chamber 110 and mixed together to form a concrete mixture, as shown in FIG. 1.

The system 600 may include a cooling system to lower the temperature of the aggregate 104 on the conveyance device 602 prior to mixing to improve the curing of the concrete as delivered at the job site 118. In one particular implementation, liquid nitrogen 604 may be disposed in the pathway of the aggregate 104 or aggregate and cement combination. For example, a spray or curtain of liquid nitrogen 604 may be disposed so that it contacts the aggregate 104 in its travel along the conveyor 602. In some instances, a liquid nitrogen storage tank 606 may store and supply liquid nitrogen under pressure via pipeline 608 to a converter device 610 for application on the aggregate 104, The converter device 610 may be a spray head or other device for applying liquid nitrogen onto the aggregate 104. Some particular embodiments of the converter device 610 are disclosed in U.S. patent application Ser. No. 15/882,795, filed Jan. 29, 2018, and 63/027,319, filed on May 19, 2020, the entirety of both of which are hereby incorporated by reference. A valve 612 may be used to control the flow of liquid nitrogen to the converter device 610. The converter device 610 may, in some instances, convert the pressurized input of nitrogen to an unpressurized flow of liquid nitrogen onto the aggregate 104. An output port of the converter 610 outputs the unpressurized liquid nitrogen onto the aggregate 104 such that the aggregate can be flowed through the spray of liquid nitrogen 604.

A liquid nitrogen dispensing controller 614 may connected to or otherwise in communication with one or more components of the liquid nitrogen dispensing system 600 to control application of nitrogen onto the aggregate 104. For example, the controller 614 may provide a control signal to the converter 610, the valve 612, the tank 606 or any other control component of the cooling system to reduce or stop the flow of the liquid nitrogen 604 onto the aggregate 104. In one implementation described herein, the controller 614 may receive control signals from the concrete mix control tool 206 to control the flow of liquid nitrogen 604 in response to an estimated temperature or other mixture property upon delivery at a job site 118, as described above.

An output from the concrete mix control tool 206 may be provided to a controller 614 which, in response to the output, may control flow of the liquid nitrogen 604 from the converter 610.

As described above, the concrete mix control tool 306 may determine that the estimated temperature of the concrete mix exceeds a threshold value of an acceptable range of temperatures. In such circumstances, the concrete mix control tool 306 may generate an instruction, command, or the like to the cooling controller 614 to increase or decrease the amount of liquid nitrogen 604 applied to the aggregate 104. The controller 614 may be configured to provide application or remove application of the liquid nitrogen 604 onto the aggregate 104 in response to the output of the concrete mix control tool 306. For example, the concrete mix control tool 306 may provide, based on an estimated temperature of a concrete mix at a job site 118, an indication to the controller 614 to lower a temperature of the aggregate ingredient 104 to be included in the concrete mix. In response, the controller 614 may control some component, such as valve 612, of the dispensing system to begin application of the liquid nitrogen 604 onto the aggregate 104 prior to addition of the aggregate into the mixer 110. In another example, the controller 614 may be instructed to stop flow of the coolant 604 onto the aggregate 104 if the estimated mixture temperature at the job site 118 is below a lower threshold temperature for proper curing. In this manner, the concrete mix control tool 306 may control a liquid nitrogen 604 or other type of cooling unit or system of the batching plant 102 in response to an output of the concrete mix control application. In another example, an ice dispenser may be controlled, based on an output, to add ice to the mixer 110 to cool a concrete mix. In still another example, an instruction, command, or measurement may be displayed on a display device indicating the output of the concrete mix control tool 306. An operator of the batching plant 102 may then utilize the controller 614 or other type of controller to adjust the temperature of an ingredient to the concrete mixture or to adjust the recipe of the concrete mix. Other methods for control of the initial temperature of the concrete mixture are also contemplated.

Figure 7:
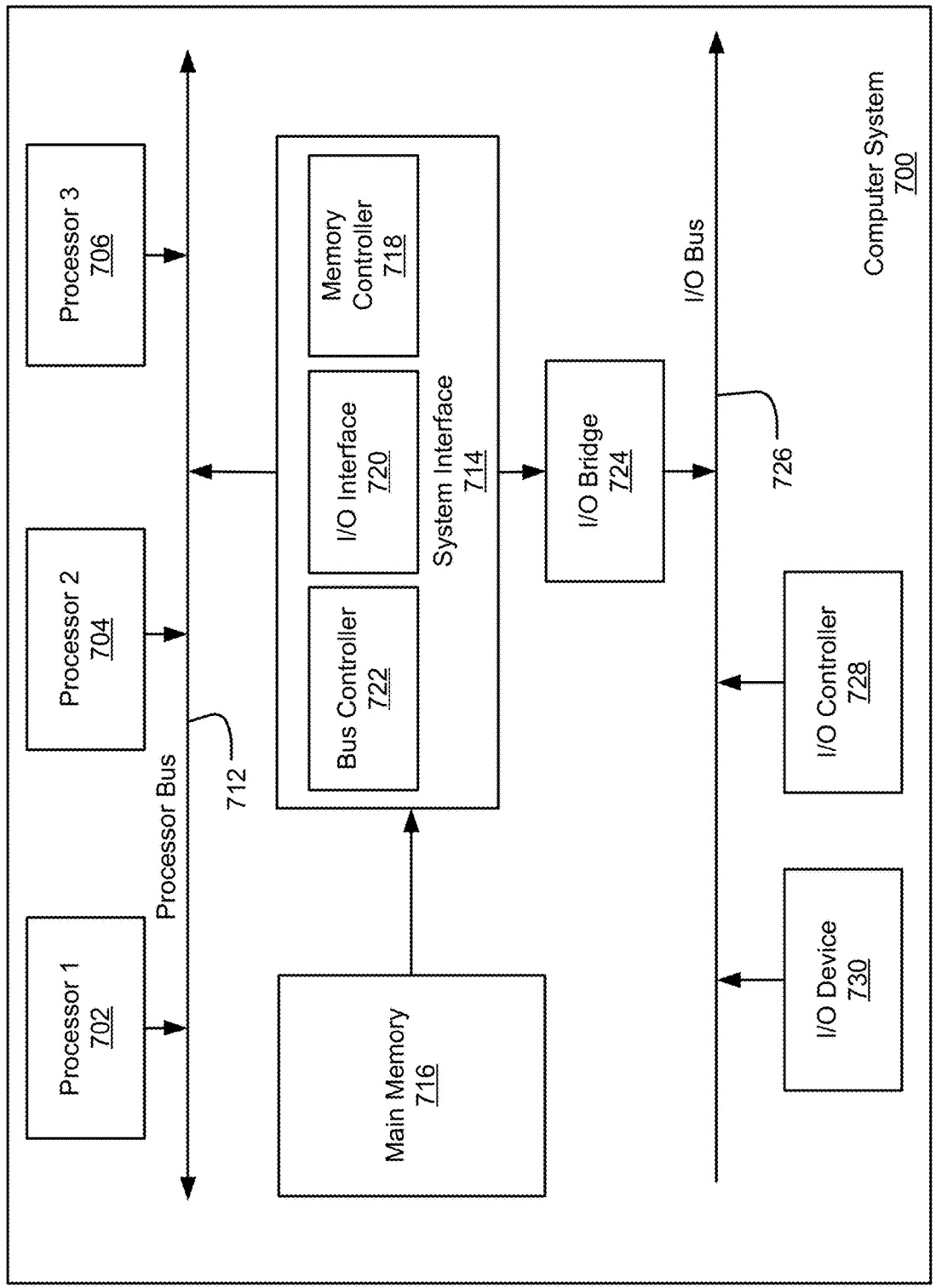
FIG. 7 depicts an exemplary computing system that may implement various services, systems, and methods discussed herein.

FIG. 7 is a block diagram illustrating an example of a computing device or computer system 700 which may be used in implementing the embodiments of the components of the network disclosed above. For example, the computing system 700 of FIG. 7 may be the concrete mix control tool 306 of the cooling systems discussed above. The computer system (system) includes one or more processors 702-706. Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 718 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. One or more I/O controllers and/or I/O devices may be connected with the I/O bus 726, such as I/O controller 728 and I/O device 730, as illustrated.

I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system set forth in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 706 may include volatile memory (e.g., dynamic random access memory (DRAM), static random access memory (SRAM), etc.) and/or non-volatile memory (e.g., read-only memory (ROM), flash memory, etc.).

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
   obtaining, using a processing device and based on a thermal measurement and a measurement of an amount of each of a plurality of ingredients to a concrete mixture prior to batching, an initial value of a property of the concrete mixture;
   estimating, based on the initial value of the property of the concrete mixture, a determined transit route from a first geographic location to a second geographic location, an exterior color of a transport vehicle, and environmental data associated with the determined transit route, a change in the initial value of the property of the concrete mixture during transport of the concrete mixture from the first geographic location to the second geographic location; and
   controlling, based on the estimated change in the value of the property, a liquid nitrogen dispenser of a batching plant to dispense liquid nitrogen onto an aggregate stream carried by a conveyor belt to a mixing chamber of a concrete mixing device to change the value of the property of the concrete mixture after batching.

2. The method of claim 1, wherein the environmental data associated with the transit route comprises one of a relative humidity, an ambient temperature, wind speed, an estimated traffic condition of the transit route, or an estimated transport time.

3. The method of claim 2 further comprising:
   communicating, over a network connection, with a third-party server, the server to obtain the environmental data associated with the transit route.

4. The method of claim 1, wherein the measurement of the amount of each of the plurality of ingredients to the concrete mixture comprises an indicator of each of the plurality of ingredients to the concrete mixture and a percentage of each of the plurality of ingredients to the concrete mixture.

5. The method of claim 4 further comprising:
   obtaining the indicator of each of the plurality of ingredients and the percentage of each of the ingredients to the concrete mixture via a user interface in communication with a computing device of the batching plant.

6. The method of claim 1, wherein the property of the concrete mixture is an internal temperature of the concrete mixture.

7. The method of claim 6, wherein estimating the change in the property of the concrete mixture comprises:
   obtaining, from a source of transit data, an estimated transit time from the first geographic location to the second geographic location; and
   estimating, based on the thermal measurement of each of the plurality of ingredients to the concrete mixture and the estimated transit time, a delivery internal temperature of the concrete mixture.

8. The method of claim 1, wherein the property of the concrete mixture is a slump of the concrete mixture.

9. The method of claim 1, wherein the batching plant further comprises an ice dispenser, the method further comprising transmitting, based on the estimated change in the value of the property of the concrete mixture, an instruction to the ice dispenser to adjust dispensing of ice into the mixing chamber.

10. The method of claim 1, wherein controlling the liquid nitrogen dispenser comprises transmitting, based on the estimated change in the value of the property of the concrete mixture, an instruction to the liquid nitrogen dispenser to adjust dispensing of liquid nitrogen onto the aggregate of the concrete mixture.

* * * * *